United States Patent Office 2,971,812
Patented Feb. 14, 1961

2,971,812
VAT DYE DISPERSIONS CONTAINING POLYVINYLPYRROLIDONE

Albert E. Moran, Somerville, and Earl Kaplan, North Plainfield, N.J., assignors to American Cyanamid Company, New York, N.Y., a corporation of Maine No Drawing. Filed Feb. 14, 1958, Ser. No. 715,177

13 Claims. (Cl. 8—83)

This invention relates to improved vat dye paste compositions, and more particularly, to concentrated vat dye pastes stabilized against loss of fluidity by the incorporation therein of polyvinylpyrrolidone.

Many vat dyestuffs are customarily sold in the form of concentrated aqueous pastes, since in this form, they are more easily handled and more readily used. It is important that such pastes remain fluid in order that they may be transferred from one container to another and more easily be measured out by the user and be more easily dispersible in the dyebath. Often however, such vat dye pastes tend to lose their fluidity and become thixotropic on storage. The average dyer does not have the equipment nor the time to restore the pastes to their original fluidity before use. In some cases, even with the proper equipment, one cannot restore the original fluidity. There is therefore a great need for a good and simple method of maintaining the fluidity in commercial vat dye pastes.

A number of methods have been proposed to overcome thixotropy observed with various vat dye pastes. In some cases, the use of surface active agents assists in conferring long lasting fluidity. For example, it has been proposed to use trialkylolamine triesters for this purpose. In some cases, improved results can be achieved by a sufficient reduction of the concentration of electrolytes in the paste. However, none of these methods is generally operable, and some of them involve extra expense which is not readily added to the cost of the paste.

We have found that the problem of thixotropy in vat dye pastes can be readily solved by the incorporation therein of at least 0.2% of a polyvinylpyrrolidone. Pastes which include a polyvinylpyrrolidone remain fluid for long periods of time and are thoroughly resistant to thixotropy. Although amounts greatly in excess of .2% based on the weight of the paste can be used. In practice there is little use in going over 3% of the total paste and as a practical matter, usages considerably below this are usual.

It is most surprising that the presence of polyvinylpyrrolidone has no deleterious effects on vat dye pastes, such as causing the dye solids to settle out or adversely affecting the dyeing properties of the paste. Polyvinylpyrrolidone, polymeric N-vinyl-2-pyrrolidone, is sold under various trade names in the form of solutions of varying concentration or as powders. Among the polyvinylpyrrolidone preparations commercially available are those sold under the names of Plasdone, Hamodyne, Periston, Subtosan, Peregal ST, Albigen A, and PVP–K20, PVP–K30, PVP–K40, PVP–K60 and PVP–K90. Polyvinylpyrrolidone is used under these names for a variety of purposes. It has found application in the trade as thickening agents and in the pharmaceutical field as a replacement for blood plasma in the treatment of shock. The polyvinylpyrrolidone products of commerce are known to combine with various substances and to solubilize them. In the textile field, polyvinylpyrrolidone is used to remove color from fibers and is known as a highly effective stripping agent for decolorizing or drastically weakening the color of cellulosic fibers dyed with certain vat, sulfur and direct dyestuffs. Aqueous solutions of polyvinylpyrrolidone are known to have a strong affinity for certain types of dyestuffs in solution, where the combination results in a stable complex between the polymer and the dyestuff, and the dyestuff is so firmly held that no simple way is known to release the color once the complex is formed. In view of these known uses for and properties of polyvinylpyrrolidone, it is most surprising that the incorporation of at least .2% by weight in a vat dye paste does not have marked deleterious effects on the dyeing properties of the dye paste.

From about 0.5 to 8% of the polyvinylpyrrolidone based on the total paste weight is used in the compositions of our invention and since polyvinylpyrrolidone is usually sold as a composition containing from 30 to 50% or more real components, the amount added is so adjusted that the usage of real polyvinylpyrrolidone is 0.5 to 8% of the vat dye paste. While more may be used, it is normally not necessary, and in very large quantities may have deleterious effects, such as excessive thickening of the composition. The vat dye pastes which are to be used in our invention are the concentrated pastes to be sold by the manufacturer, containing the vat dye in its unreduced or oxo form. They must have a minimum of 6% dye solids and more often have from 10 to 20% dye solids. It is in such pastes that the problem of thixotropy arises, since in more dilute suspensions such as the slurries used in vat dye baths, the amount of water alone is sufficient to keep the slurry fluid.

The compositions of our invention include concentrated vat dye pastes containing polyvinylpyrrolidone made from many different types of vat dyes, such as the indanthrones, the indigoid and the thioindigoids, the pyranthrones, the dibenzpyrenequinones, the various dibenzanthrone derivatives, anthraquinone thiazoles, anthraquinone acridones, and the like.

In the practice of our invention, the polyvinylpyrrolidone can be added to the formulation at any point during the making up of the paste. Also, other materials may be present in small amounts as are commonly used in the art, such as dispersing agents (e.g., alkylated naphthalene sulfonic acids, in which the alkyl group has from 8 to 18 carbons, such as sodium dodecylnaphthalene sulfonate, or sulfonated naphthalene-formaldehyde condensate and sodium lignin sulfate), fungicidal agents (e.g., phenol, sodium chlorinated phenolate, sodium benzoate), and other diluents (e.g., glycerin). The polyvinylpyrrolidone can be used without any other ingredients of the above nature, but usually is found to give better results when used in conjunction with these ingredients.

An especially useful species of our invention is a concentrated vat dye paste of a vat dye unstable to high temperature vatting, stabilized against decomposition in vatting by the presence of a cobalt compound and against thixotropy by polyvinylpyrrolidone. The use of such cobalt compounds in stabilizing certain leuco vat dyes to high temperatures is described in Letters Patent 2,690,-952 to Fordemwalt. The dyes in which these are especially important are those of the indanthrone class, such as dichloroindanthrone. The cobalt compound must be present in at least 15% based on the weight of the dye solids but should not exceed 50% of the weight of dye solids.

This application is a continuation-in-part of our copending application Serial No. 626,588, filed December 6, 1956, now abandoned.

Our invention is further illustrated by the following examples in which parts are by weight unless otherwise specified.

Example 1

An aqueous press cake of 3,3'-dichloroindanthrone is converted to a 43% paste by dispersing to a paste containing 20 parts of real dye, 1.0 part of alkylated naphthalene sulfonic acid, 0.5 part of phenol and sufficient water to make up 100 parts. After stirring to a smooth and homogeneous paste, the mixture is milled and screened. The paste so prepared, when added to a container, begins to lose its fluidity after a few days and becomes very thick on prolonged standing.

When a similar paste is made including 2 parts of polyvinylpyrrolidone, the mixture remains fluid after many weeks.

Example 2

A 13.5% paste of (4,5) (4',5') dibenzothioindigo (Indanthrene Brown RR) is prepared by dispersing dyestuff press cake with a high speed stirrer to a paste containing 17.2 parts of real dye, 1.0 part of alkylated naphthalene sulfonic acid, 4 parts of sodium chloride, 0.20 part of Dowicide B and sufficient water to make up 100 parts. On standing at room temperature, this paste begins to lose its fluidity within a few days.

When a similar paste is made including 2 parts polyvinylpyrrolidone, the resultant composition is fluid for weeks.

Example 3

A paste of dibromopyranthrone is prepared by dispersing a press cake with a high speed stirrer to a paste containing 12.9 parts real dye, 1.0 part of alkylated naphthalene sulfonic acid, 0.6 part sodium benzoate and enough water to make up 100 parts. The paste, after standing for 20 hours, becomes thixotropic and will not flow.

When a similar paste is prepared which includes 2 parts polyvinylpyrrolidone, it is stable for many weeks.

Example 4

A 25% paste of dibenzpyrenequinone (Indanthrene Golden Yellow GK) is prepared by dispersing press cake with a high speed stirrer, to a paste containing 14.5 parts real vat dye, 15 parts of glycerin, 0.1 part of Dowicide B, 1.5 parts of alkylated naphthalene sulfonic acid and enough water to make up 100 parts. This paste becomes thixotropic and does not flow after standing less than 24 hours.

A similar past which includes 1 part polyvinylpyrrolidone remains fluid for many days.

Example 5

An 18.4% paste of Algol Yellow GC (1,2,5,6-bis (2-phenylthiazolo) anthraquinone) is prepared by dispersing press cake with a high speed stirrer to a paste containing 9.7 parts real dye, 1.0 part alkylated naphthalene sulfonic acid, 2 parts sodium chloride, 0.6 part sodium benzoate and enough water to make up 100 parts. On standing at room temperature the paste starts to become thixotropic in a few days and will not flow.

A similar paste including 2 parts of polyvinylpyrrolidone is stable for many weeks.

Example 6

A 40% paste of the gray vat dyestuff described in U.S. Patent No. 2,456,589 is prepared by dispersing dyestuff press cake containing 20 parts of real dye with 1 part of sodium lignin sulfonate, and sufficient water to make up 100 parts. After standing for two days, it becomes thixotropic and will not flow.

The gray vat dyestuff described in the above-mentioned patent is a mixture of unknown constituents. It is the product obtained by fusing with alcoholic caustic alkali the mixture of secondary amines produced by condensing chlorinated benzanthrone containing between 11.5% and 13.5% of chlorine with one molecular equivalent of alpha-amino anthraquinone in the presence of an acid binder and a cupriferous catalyst.

A similar paste including 3 parts of polyvinylpyrrolidone is stable for many weeks.

Example 7

A paste is prepared by dissolving cobaltous chloride hexahydrate and polyvinylpyrrolidone in water and adding the resulting solution to an equal quantity of a paste of 3,3'-dichloroindanthrone. The resulting paste has the composition:

| Component: | Parts |
| --- | --- |
| 3,3'-dichlorindanthrone | 10 |
| Sodium salt of sulfonated formaldehyde-naphthalene condensate | 0.15 |
| Phenol | 0.25 |
| Glycerine | 2.5 |
| Dextrine | 1.0 |
| Polyvinylpyrrolidone | 2.0 |
| Cobaltous chloride | 2.0 |
| Water | 82.1 |
| | 100.00 |

This paste not only does not develop thixotropy, but also is stable to vatting at high temperature. Sodium dodecyl naphthalene sulfonate can be used in place of the sulfonated formaldehyde-naphthalene condensate.

We claim:

1. A vat dye paste composition comprising at least 6% of a vat dye, water, and at least 0.2% but not over 3.0% polyvinylpyrrolidone based on the total paste weight.

2. The compositions of claim 1 in which a separate dispersing agent is included.

3. The compositions of claim 2 in which the dispersing agent is an alkylated naphthalene sulfonic acid.

4. The compositions of claim 3 in which the vat dye is dibromopyranthrone.

5. The compositions of claim 3 in which the vat dye is dibenzpyrenequinone.

6. The compositions of claim 3 in which the vat dye is 1,2,5,6-bis(2-phenylthiazolo) anthraquinone.

7. The composition of claim 3 in which the vat dyestuff is the gray vat dyestuff obtained by fusing with alcoholic caustic alkali the mixture of secondary amines produced by condensing chlorinated benzanthrone containing between 11.5% and 13.5% of chlorine with one molecular equivalent of alpha-amino anthraquinone in the presence of an acid binder and a cupriferous catalyst.

8. The compositions of claim 3 in which the vat dye is an indanthrone.

9. The compositions of claim 8 in which the vat dye is 3,3'-dichloroindanthrone.

10. The composition of claim 9 which contains also at least 15% but not over 50% of a cobalt compound, based on the weight of the dyestuff.

11. The composition comprising 20% 3,3'-dichloroindanthrone, 1.0% alkylated naphthalene sulfonic acid, 0.5% phenol, 2% polyvinylpyrrolidone and sufficient water to make up 100%.

12. The composition of 25 parts of dibenzpyrenequinone, 15 parts of glycerin, 0.1 part of a fungicide, 1.5 parts of alkylated naphthalene sulfonic acid, 1 part of polyvinylpyrrolidone and sufficient water to make up 100 parts.

13. The composition comprising 10% 3,3'-dichloroindanthrone, 0.15% alkylated naphthalene sulfonic acid, 0.25% phenol, 2.5% glycerine, 1.0% dextrine, 2.0% polyvinylpyrrolidone, 2.0% cobaltous chloride, and 82.1% water.

(References on following page)

References Cited in the file of this patent

UNITED STATES PATENTS

| | | |
|---|---|---|
| 1,685,401 | Lawrence | Sept. 18, 1928 |
| 1,933,068 | Nuesslein | Oct. 31, 1933 |
| 2,101,828 | Wass et al. | Dec. 7, 1937 |
| 2,205,950 | Flett | June 25, 1940 |
| 2,798,788 | Studer | July 9, 1957 |
| 2,803,583 | Petersen | Aug. 20, 1957 |

OTHER REFERENCES

Hansen et al.: "Polyvinyl Pyrrolidone," Proc. of the Am. Assoc. of Textile Chem. and Colorists, February 1954.

Schwartz et al.: "Surface Active Agents and Detergents," 1958, Intersci. Pub., New York, pp. 306–307.

Desirens: "The Chem. Tech. of Dyeing and Printing," 1948, Reinhold Pub. Co., New York, p. 420.